June 20, 1961    G. SMITH    2,989,711
POSITION MEASURING APPARATUS
Filed Nov. 1, 1957

INVENTOR
GRAYDON SMITH
BY
Curtis, Morris & Safford
ATTORNEYS

United States Patent Office 2,989,711
Patented June 20, 1961

2,989,711
POSITION MEASURING APPARATUS
Graydon Smith, Concord, Mass., assignor, by mesne assignments, to Clevite Corporation
Filed Nov. 1, 1957, Ser. No. 693,919
3 Claims. (Cl. 336—30)

This invention relates to position measuring apparatus, and more particularly to apparatus adapted to produce an electrical signal which varies in accordance with changes in the positioning of a movable element. Devices of the general type with which the present invention is concerned are shown in U.S. Patents Nos. 2,207,248, 2,631,272, 2,697,214 and 2,700,758.

In such devices, a movably-mounted "flux-barrier," i.e. a closed loop of conductive material, controls the relative distribution of alternating magnetic flux between two magnetic circuit paths. Typically, the device comprises a three-legged core (as generally shown in FIGURE 1 of the drawings) formed of ferromagnetic material, with the central leg having an air-gap within which the flux-barrier is arranged to move.

The operation of these devices is briefly as follows: Flux is produced by a primary winding surrounding the central leg, and secondary windings on the two outer legs develop signals in accordance with the amount of flux passing respectively through these outer legs. The secondary windings are connected in series-opposition, so that, when the flux-barrier is positioned in the center of the air-gap and the flux produced by the primary winding is essentially evenly divided between the two outer legs, the individual secondary voltages will cancel to produce a "null" or zero output. As the flux-barrier is moved away from this position, the flux passing through the secondary windings is correspondingly unbalanced, with the result that the net voltage produced by the secondary windings has a finite value directly related to the position of the flux-barrier.

To minimize eddy-current losses, the magnetic core should comprise a stack of thin laminar plates. Desirably, this stack is made of "complementary" plates (wherein at least two types of plate sections are alternately placed together in sandwich-fashion to form the complete core outline), so as to permit assembly of the core with pre-formed primary and secondary windings. Typically, these plate sections will be of generally L-shaped and F-shaped configuration (see FIGURE 2 of the drawings). And, to assure magnetic symmetry of the core about the central leg, each alternate pair of these plate sections will be reversed; that is, the side strip of one L will lie in the left-hand outer leg, while the side strip of the next L will lie in the right-hand outer leg, etc.

For proper operation of such devices, the flux-barrier should be formed from a solid one-piece element, i.e. without any joints or seams in the path of currents circulating around the loop. Also, in the interests of "miniaturization" and to reduce resistive power losses in the flux-barrier, it is especially desirable that the flux-barrier be small in size and particularly that it fit very closely about the bottom portion of the magnetic core.

Because of these requirements, the assembly of a device of the type described has presented certain problems. This is particularly so because it is necessary that each L-shaped plate be inserted into the flux-barrier loop and one of the pre-formed secondary windings at the same time. To accomplish this, the practice in the past has been first to insert the bottom strip of one L into the flux-barrier, leaving the barrier positioned near the remote tip of this strip. Then, the L is tipped at an angle until its side strip can be fitted into the corresponding secondary winding. When the next L is to be put in place, the flux-barrier first is shifted to the corner of the previous L, and the bottom strip of the new L is inserted through the flux-barrier. Thereafter, the new L is tipped at an angle so its side strip can be fitted into the opposite secondary winding. This process of alternately shifting the flux-barrier back and forth along the bottom portion of the core, and "jockeying" the L-shaped plates into the flux-barrier and secondary windings is continued until the entire magnetic core has been built up.

It has been found that this assembly difficulty can be avoided in accordance with the present invention, one embodiment of which is shown and described herein in detail. Accordingly, it is an object of this invention to provide a device of the type described which is particularly well adapted for rapid and economical manufacture. Other objects, advantages and aspects of the present invention will be in part apparent from, and in part pointed out in, the following description of a preferred embodiment considered together with the accompanying drawing, in which.

Figure 1:
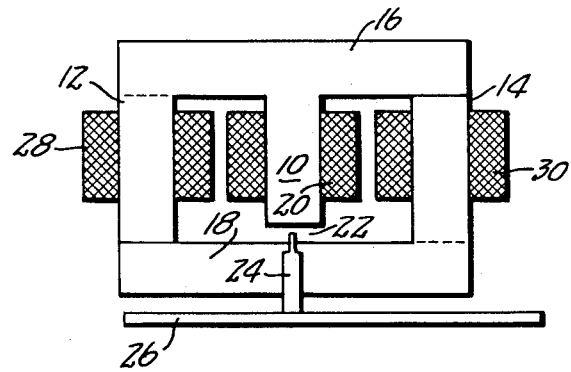
FIGURE 1 shows diagrammatically a position measuring device of conventional type.

The device shown in FIGURE 1 includes a magnetic core comprising a central leg 10 and a pair of outer legs 12 and 14 joined together by top and bottom core portions 16 and 18. A primary winding 20 is wound around the central leg to produce flux in the magnetic core. The central leg is interrupted at its lower end to form an air-gap 22 with the bottom portion of the core.

A flux-barrier 24 is positioned around the bottom core portion 18 and extends into the air-gap 22. This flux-barrier is movably mounted on a slide 26 for rectilinear motion within the air-gap 22 and serves to control the relative magnitudes of the flux linkages passing through the outer legs 12 and 14 in a manner explained in detail in the above-mentioned patents. Surrounding the outer legs 12 and 14 are respective secondary windings 28 and 30 which produce corresponding output voltages in accordance with the flux passing through these outer legs. The secondary windings are connected in series-opposition and the net output voltage is fed to an electrical measuring device (not shown) such as a voltmeter or recording instrument. With this arrangement, the net output voltage produced by the secondary windings is a direct function of the position of the flux-barrier 24 within the air-gap 22.

Figure 2:
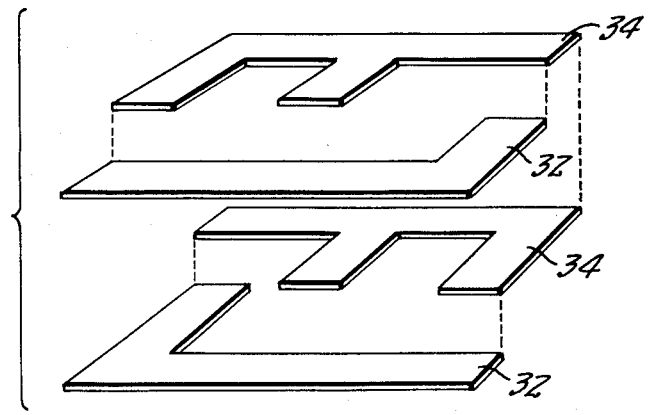
FIGURE 2 is a perspective view of several laminar plates such as may be used to form the magnetic core of a device of the type shown in FIGURE 1.

The magnetic core of a device such as shown in FIGURE 1 advantageously comprises a stack of "complementary" laminar plates several of which are shown in FIGURE 2. These plates are of two different configurations, one (reference 32) being generally L-shaped and the other (reference 34) being generally F-shaped. As can be seen in FIGURE 2, these two types of plates, when stacked together in abutting relationship, form a three-legged core of the FIGURE 1 arrangement that is magnetically balanced about the axis of symmetry through the central leg.

Figure 3:
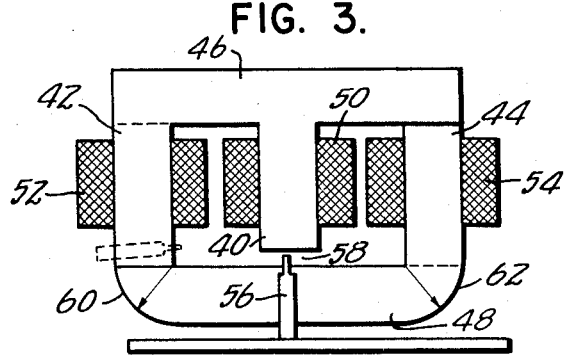
FIGURE 3 shows diagrammatically a position measuring device constructed in accordance with the present invention.

It has been found that the above-described problems of assembling such laminar plates with preformed windings and a close-fitting flux-barrier can effectively be solved by the core construction shown in FIGURE 3. As in FIGURE 1, this device comprises a three-legged core having a central leg 40 and two outer legs 42 and 44 joined together by top and bottom portions 46 and 48. A primary winding 50 and secondary windings 52 and 54 are wound on the respective core legs, and a flux barrier 56 is arranged to move within the air-gap 58.

The magnetic core of the device shown in FIGURE 3 is made of "complementary" laminar plates of the type generally shown in FIGURE 2. However, in accordance with the present invention, the corners of the bottom strip of each L-shaped plate are rounded along the outer edges thereof in the regions indicated by the reference numerals 60 and 62. The radius of curvature of these corners is less than the height of the flux-barrier aperture so that the flux-barrier can be shifted around the corner, e.g. to and from the position shown in dotted outline at 56a.

With this construction, the magnetic core can be assembled with the flux-barrier 56 positioned around one of the outer legs 42 or 44, thereby considerably simplifying the production procedures. That is, the side strips of the alternate L-shaped and F-shaped laminar plates will be inserted directly through the flux-barrier loop and the corresponding secondary winding 52 or 54, thereby eliminating the previous operations of shifting the flux-barrier back and forth, and tipping the L to manipulate it into place. After the core has been completely assembled, of course, the flux-barrier then is shifted back from the outer leg to the bottom core portion 48 where it is positioned in the air-gap 58 for operation of the device.

It may particularly be noted that, with this improved construction, the cross-sectional area of the core corners 60 and 62 is not less than the cross-sectional area of the bottom core portion 48 or the side legs 42 and 44. Thus, the flux-carrying capacity of the core is maintained sufficiently to assure efficient utilization of the magnetic core material.

Although a preferred embodiment of the invention has been set forth in detail, it is desired to emphasize that this is not intended to be exhaustive or necessarily limitative; on the contrary, the showing herein is for the purpose of illustrating one form of the invention and thus to enable others skilled in the art to adapt the invention in such ways as meet the requirements of particular applications, it being understood that various modifications may be made without departing from the scope of the invention as limited by the prior art.

I claim:

1. In the art of assembling a transducer of the type which includes a three-legged magnetic core having a central leg and two outer legs joined together by top and bottom members, said central leg being formed adjacent said bottom member with an air-gap adapted to permit the movement therethrough of a conductive closed-loop flux-barrier surrounding said bottom member, and wherein said outer legs carry electrical windings operative in developing electrical signals in accordance with the positioning of said flux-barrier in said air-gap; the improved method of assemblying said transducer comprising the steps of: inserting the side strip of a first L-shaped laminar plate through said flux-barrier and through one of said windings, the bottom strip of laminar plate serving in part to define the bottom member of said transducer; inserting the side strip of a second L-shaped laminar plate through the other one of said windings; positioning the bottom strip of said second laminar plate over said bottom strip of said first laminar plate in aligned relation thereto; and shifting said flux-barrier down from said side strip of said first laminar plate to a position encircling both of said bottom strips.

2. In a known position measuring device of the type including a three-legged magnetic core having a central leg and two outer legs joined together by top and bottom portions, said core comprising a plurality of complementary laminar plates stacked together, primary winding means coupled to said core for producing flux therein, secondary winding means coupled to said core for producing an output signal in accordance with the relative division of said flux between said two outer legs, at least one of said winding means comprising first and second windings on said outer legs respectively, said core being formed with an air-gap in said central leg, and a movable flux-barrier positioned to extend into said air-gap and closely fitted about said bottom core portion, the division of said flux between said outer legs being a function of the position of said flux-barrier within said air-gap; that improvement in said position measuring device wherein the intersection between said bottom core portion and one of said outer legs is provided with a cut-back corner dimensioned to permit said flux-barrier to be shifted between said bottom core portion and said one outer leg.

3. A position measuring device as claimed in claim 2, wherein the outer surface of said corner is curved with a radius of curvature less than the height of the aperture formed by said flux-barrier.

References Cited in the file of this patent

UNITED STATES PATENTS 2,053,176    Bouwers  ---------------  Sept. 1, 1936